United States Patent
Bohn

(10) Patent No.: US 9,994,782 B2
(45) Date of Patent: Jun. 12, 2018

(54) METHOD AND DEVICE FOR SEPARATING SYNTHESIS GAS

(71) Applicant: Jan-Peter Bohn, Starnberg (DE)

(72) Inventor: Jan-Peter Bohn, Starnberg (DE)

(73) Assignee: Linde Aktiengesellschaft, Munich (DE)

( * ) Notice: Subject to any disclaimer, the term of this patent is extended or adjusted under 35 U.S.C. 154(b) by 141 days.

(21) Appl. No.: 15/097,880

(22) Filed: Apr. 13, 2016

(65) Prior Publication Data
US 2016/0312137 A1    Oct. 27, 2016

(30) Foreign Application Priority Data

Apr. 23, 2015    (DE) .................... 10 2015 005 203

(51) Int. Cl.
| | |
|---|---|
| *C10K 1/00* | (2006.01) |
| *B01D 53/18* | (2006.01) |
| *B01D 53/14* | (2006.01) |
| *C10L 3/00* | (2006.01) |
| *C10K 1/08* | (2006.01) |
| *C10K 3/04* | (2006.01) |

(52) U.S. Cl.
CPC .......... *C10K 1/004* (2013.01); *B01D 53/1425* (2013.01); *B01D 53/1468* (2013.01); *B01D 53/1493* (2013.01); *B01D 53/18* (2013.01); *C10K 1/08* (2013.01); *C10K 3/04* (2013.01); *C10L 3/00* (2013.01); *B01D 2252/2021* (2013.01); *B01D 2256/16* (2013.01); *B01D 2256/20* (2013.01); *B01D 2256/22* (2013.01); *B01D 2257/304* (2013.01); *B01D 2257/308* (2013.01); *C10L 2290/541* (2013.01); *C10L 2290/545* (2013.01)

(58) Field of Classification Search
CPC .......... C10L 2290/541; B01D 53/1425; B01D 53/1493; B01D 53/18; B01D 53/1431; B01D 53/1456

See application file for complete search history.

(56) References Cited

U.S. PATENT DOCUMENTS

| | | | | |
|---|---|---|---|---|
| 3,245,752 | A | * | 4/1966 | Fryar ................. B01D 53/1456 423/229 |
| 4,552,572 | A | * | 11/1985 | Galstaun ................ B01D 53/14 95/161 |

(Continued)

*Primary Examiner* — Matthew J Merkling
(74) *Attorney, Agent, or Firm* — Philip H. Von Neida

(57) ABSTRACT

A method for operating a gas scrubber, wherein a first feed gas is scrubbed in a first scrubbing installation and a second feed gas is scrubbed in a second scrubbing installation operated in parallel to the first, with the same physically acting scrubbing medium, in order to dissolve sulfur components out of the feed gases containing contaminants and to obtain desulfurized gas streams, wherein scrubbing medium streams loaded with sulfur components and co-absorbed carbon monoxide arise, and wherein the first feed gas, the carbon monoxide partial pressure of which is lower than that of the second, is scrubbed in the first scrubbing installation at a lower pressure than the second feed gas in the second scrubbing installation. The scrubbing medium is loaded in the second scrubbing installation with sulfur components and co-absorbed carbon monoxide is expanded into the first scrubbing installation to convert dissolved carbon monoxide to the gas phase.

5 Claims, 1 Drawing Sheet

(56) References Cited

U.S. PATENT DOCUMENTS

| | | | | |
|---|---|---|---|---|
| 4,568,364 A | * | 2/1986 | Galstaun | B01D 53/14 95/176 |
| 2007/0129450 A1 | * | 6/2007 | Barnicki | C10G 2/30 518/704 |
| 2015/0165366 A1 | * | 6/2015 | Brandl | B01D 53/1468 95/187 |

* cited by examiner

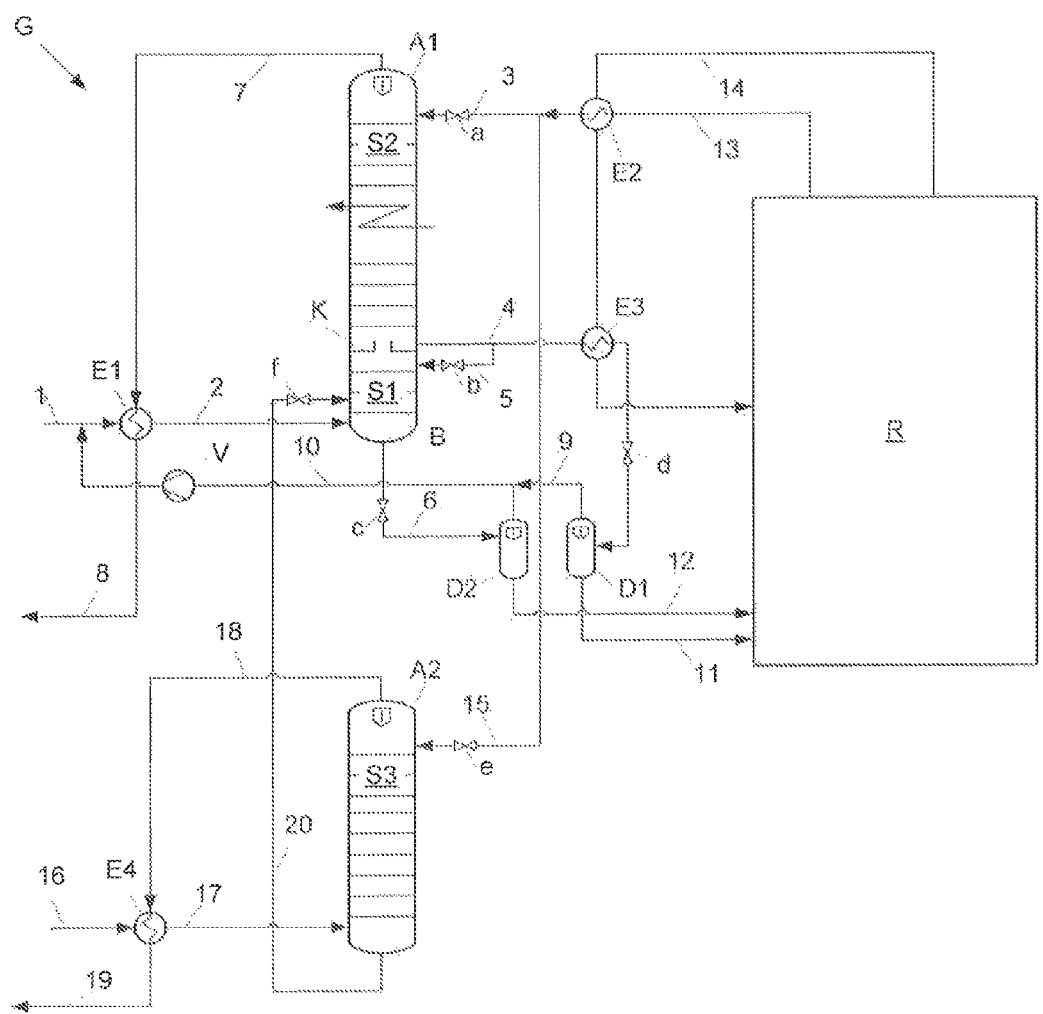

METHOD AND DEVICE FOR SEPARATING SYNTHESIS GAS

CROSS REFERENCE TO RELATED APPLICATIONS

This application claims priority from German Patent Application DE 102015005203.9 filed on Apr. 23, 2015.

BACKGROUND OF THE INVENTION

The invention relates to a method for operating a gas scrubber, in which a first feed gas is scrubbed in a first scrubbing installation and a second feed gas is scrubbed in a second scrubbing installation operated in parallel to the first, in each case with the same physically acting scrubbing medium, in order to dissolve sulfur components out of the feed gases containing hydrogen, carbon monoxide, carbon dioxide, and also carbonyl sulfide and/or hydrogen sulfide and to obtain desulfurized gas streams, wherein scrubbing medium streams loaded with sulfur components and co-absorbed carbon monoxide arise, and wherein the first feed gas, the carbon monoxide partial pressure of which is lower than that of the second, is scrubbed in the first scrubbing installation at a lower pressure than the second feed gas in the second scrubbing installation.

In addition, the invention relates to a device for carrying out the method according to the invention.

The wording that the two feed gases "are scrubbed with the same physically acting scrubbing medium" is not intended to state that the scrubbing media used must be chemically and physically identical. Rather, it means that the scrubbing media used consist of the same basic substance which, however, can be to a greater or lesser extent loaded with substances which have been separated off from a feed gas or both feed gases.

Methods and devices of the type in question are known, for example, from the patent applications DE19651282, DE102012016643 and DE102013001677, the contents of the disclosures of which are incorporated in their entirety by reference in the present description. They are used, for example, in order to produce crude hydrogen and a carbon dioxide-rich gas turbine fuel gas containing hydrogen and carbon monoxide from a synthesis gas. The synthesis gas for this purpose is separated into a first part and a second part, wherein the first part is converted by water gas shift before it is introduced into the first scrubbing installation in order to scrub out carbon dioxide and sulfur components, whereas the second part is fed without further treatment to the second scrubbing installation for separating off sulfur components. On account of the pressure drops occurring during the conversion, the first scrubbing installation is usually operated at a lower pressure than the second. In both scrubbing installations, in each case, a scrubbing medium stream loaded with sulfur components and carbon dioxide arises, whereas, at least in the first scrubbing installation, in addition, a scrubbing medium stream is generated which is only loaded with carbon dioxide. The loaded scrubbing medium streams are passed on to the regenerating part of the gas scrubber, where the dissolved substances are separated off in order to leave the gas scrubber in product or tailgas streams.

Although hydrogen and carbon monoxide have a significantly lower solubility coefficient than carbon dioxide and the sulfur components present in the synthesis gas with respect to the physically acting scrubbing medium used, which is preferably methanol, in the scrubbing of the synthesis gases, hydrogen and carbon monoxide are also unavoidably dissolved out of the scrubbing medium in small amounts. In order to prevent the yield of hydrogen and/or of carbon monoxide and hydrogen being reduced by this process termed co-absorption, and to avoid the co-absorbed substances passing into a product stream or tailgas stream via the regenerating part of the gas scrubber, according to the prior art, the scrubbing medium streams loaded in the scrubbing installations are cooled and, in a first regeneration step, in each case expanded into a separate expansion vessel to a pressure which is generally less than a third of the pressure at which the gas scrubbing is carried out. The co-absorbed substances are in this case substantially converted into the gas phase, whereas carbon dioxide and sulfur components remain dissolved in the scrubbing medium for the most part and are not separated off until subsequent regeneration steps. The completely regenerated scrubbing medium is recirculated to the two scrubbing installations and used again for synthesis gas scrubbing.

The gas phases from the expansion vessels which, in addition to hydrogen and carbon monoxide, also contain carbon dioxide and sulfur components are compressed and recirculated to the first synthesis gas upstream of the first scrubbing installation. In this manner, although a high product yield and also high purities of product streams and tailgas streams are achieved from the regenerating part of the gas scrubber, at the same time, the costs arising in particular for the compression required of the gas phases that are to be recirculated have a negative effect on the economic efficiency of the method.

The object of the present invention is therefore to specify a method and a device of the type in question that permit the disadvantages of the prior art to be overcome.

SUMMARY OF THE INVENTION

The object in question is achieved in terms of the method according to the invention in that scrubbing medium that is loaded in the second scrubbing installation with sulfur components and co-absorbed carbon monoxide is expanded into the first scrubbing installation in order to convert dissolved carbon monoxide to the gas phase.

The pressure in the first scrubbing installation that is reduced in comparison with the pressure in the second scrubbing installation exerts a stripping action which is still further reinforced by the lower carbon monoxide partial pressure of the first feed gas and which leads to an effective carbon monoxide removal, as a result of which the carbon monoxide contents in the two loaded scrubbing media substantially equalize.

Owing to the method according to the invention, the carbon monoxide that is co-absorbed in the second scrubbing installation arrives predominantly directly into the desulfurized gas mixture generated in the first scrubbing installation, and need not be compressed, as in the prior art, with expenditure of energy, or recirculated to the first scrubbing installation. Furthermore, the carbon monoxide that is separated off from the scrubbing medium cannot contribute to the pollution of product gases or tailgases that are generated in the regenerating part of the gas scrubber.

In order to reduce further the content of co-absorbed substances in the scrubbing medium loaded in the second scrubbing installation, said scrubbing medium can be taken off from the first scrubbing installation and subjected to a pressure fall. The gas phase formed in this case that consists substantially of carbon monoxide and hydrogen is preferably compressed and recirculated to the first scrubbing installation together with the first feed gas.

On account of the stripping action in the first scrubbing installation, sulfur components can also be liberated into the gas space of the first scrubbing installation from the scrubbing medium loaded in the second scrubbing installation.

In order to prevent these sulfur components leading to a contamination of the desulfurized gas stream, the scrubbing medium loaded in the second scrubbing installation is preferably introduced into the first scrubbing installation at a site at which it is ensured that the liberated sulfur components may be reliably back-extracted by the first scrubbing medium.

Usually, for carrying out methods of the type in question, scrubbing installations are used that are designed as absorber columns having mass-transfer trays and/or mass-transfer packings. Such absorber columns which have been known to those skilled in the art for many years frequently have a plurality of sections separated from one another by chimney trays, in which sections substances having different solubility coefficients can be substantially separated off selectively from the feed gas that is to be treated. Beneath the lowest mass-transfer tray, or the lowest mass-transfer packing, is arranged the feed-in installation for the feed gas that is to be treated, whereas physically acting scrubbing medium can be fed to the absorber column above the topmost mass-transfer tray, or above the topmost mass-transfer packing. At the top of the absorber column there is situated a takeoff installation for the treated feed gas, and at the lower end thereof, a further take-off installation, via which loaded scrubbing medium is removable from the sump space of the absorber column. The lower region of such an absorber column can have, for example, a separate section for separating off sulfur components, above which one section is arranged for separating off carbon dioxide from the feed gas that is to be treated. The feed gas that is to be treated is supplied to the absorber column in a bottom region thereof and, on its path upwards, is brought into intensive contact with the physically acting scrubbing medium that is applied to the respective section at the upper end thereof.

An expedient embodiment of the method according to the invention provides that, at least as first scrubbing installation, an absorber column of the above-described type is used that preferably has a separate section for separating off sulfur components, wherein second scrubbing medium that is loaded in the second scrubbing installation with sulfur components and co-absorbed carbon monoxide is introduced to separate off sulfur components immediately above one of the lowest mass-transfer trays, or of the lowest mass-transfer packing, or in the region of the lowest mass-transfer packing. Hereby, an intensive contact between the second loaded scrubbing medium and the first feed gas is achieved, via which the stripping off of carbon monoxide is promoted. At the same time, there is also sufficient opportunity to back-extract the sulfur components liberated in the expansion from the gas phase conducted upwards in the section.

Preferably, the two feed gases are obtained from a synthesis gas that for this purpose is divided into two parts, wherein the one part, after a treatment by water gas shift, is present as first feed gas and the second part forms the second feed gas.

When the method according to the invention is carried out, a multiplicity of substances can be used as physically acting scrubbing medium. Preferably, however, methanol is used as scrubbing medium.

In addition, the invention relates to a device for gas scrubbing having a first scrubbing installation and a second scrubbing installation that is operable in parallel thereto, the two each comprising installations for feeding a feed gas containing hydrogen, carbon monoxide, carbon dioxide, and also carbonyl sulfide and/or hydrogen sulfide and a physically acting scrubbing medium into the scrubbing installation, and also installations for taking off desulfurized feed gas and scrubbing medium that is loaded with sulfur components and co-absorbed carbon monoxide from the scrubbing installation.

The object in question is achieved in terms of the device according to the invention in that the second scrubbing installation is flow-connected to the first scrubbing installation in such a manner that scrubbing medium loaded with sulfur components and co-absorbed carbon monoxide is expandable from the second scrubbing installation into the first scrubbing installation.

Preferably, at least the first scrubbing installation is designed as an absorber column having mass-transfer trays and/or mass-transfer packings arranged one above the other.

Particularly preferably, the first scrubbing installation that is designed as an absorber column possesses a feed-in installation, via which scrubbing medium from the second scrubbing installation that is loaded with sulfur components and co-absorbed carbon monoxide can be introduced into the first scrubbing installation immediately above one of the lowest mass-transfer trays, or of the lowest mass-transfer packing, or in the region of the lowest mass-transfer packing.

In order, in the second scrubbing installation, to be able to expand scrubbing medium loaded with sulfur components and co-absorbed carbon monoxide into the first scrubbing installation, it can be necessary to provide a pump with which the pressure of the loaded scrubbing medium can be elevated. Preferably, however, the first scrubbing installation is positioned with respect to the second scrubbing installation in such a manner that scrubbing medium loaded in the second scrubbing installation with sulfur components and co-absorbed carbon monoxide can be transferred solely owing to the total pressure difference established in operation between the two scrubbing installations. The overall pressure is composed in this case of the working pressure prevailing in a scrubbing installation and the hydrostatic pressure of the scrubbing medium.

In a further embodiment of the device according to the invention, the first scrubbing installation is flow-connected to a separator in such a manner that scrubbing medium loaded in the second scrubbing installation is expandable from the first scrubbing installation into the separator, in order to obtain a gas phase. Preferably, the flow connection also comprises a compressor, via which the resultant gas phase can be taken off from the separator and recirculated to the first scrubbing installation.

BRIEF DESCRIPTION OF THE DRAWINGS

Hereinafter, the invention will be described in more detail with reference to an exemplary embodiment shown schematically in FIG. 1.

FIG. 1 shows a preferred embodiment of the invention having two absorber columns operated in parallel in which a shifted synthesis gas and an unshifted synthesis gas are scrubbed with methanol.

DETAILED DESCRIPTION OF THE INVENTION

Via line 1, a shifted synthesis gas that predominantly consists of hydrogen and carbon dioxide, but in addition also contains carbon monoxide and sulfur components, is fed to the gas scrubber G. In the heat exchanger E1, the synthesis gas 1 is cooled against method streams that are to be heated, before it can be applied via line 2 to the first scrubbing installation A1 that is designed as an absorber column, in the lower region thereof. The absorber column A1 which is operated at a pressure that is typically between 15 and 75 bar, has a lower scrubbing section S1 and an upper scrubbing section S2 which are separated from one another by a chimney tray K. The cold synthesis gas 2 is passed upwardly in the absorber column A1 and in this case brought into intensive contact with methanol scrubbing medium, which is introduced into the scrubbing section S2 unloaded via line 3 and the control element a in order to separate off the carbon dioxide present in the synthesis gas 2. Via the lines 4 and 5, and also the control element b, methanol scrubbing medium that is already preloaded with carbon dioxide is passed on from the scrubbing section S2 into the scrubbing section S1, where it predominantly absorbs sulfur components from the synthesis gas. The desulfurized synthesis gas is passed further via the chimney tray K into the scrubbing section S2, whereas methanol scrubbing medium loaded with carbon dioxide and sulfur components is taken off from the sump space of the absorber column A1 and conducted further via line 6. From the top of the absorber column A1, a gas 7 predominantly comprising hydrogen can be taken off, which, after warming against the crude synthesis gas 1, is delivered, for example, as crude hydrogen 8. The loaded methanol streams 4 and 6 are expanded into the two separators D1 and D2 via the throttle elements c and d, typically to a third of the starting pressure. The gas phases formed in this case, which predominantly consist of hydrogen and carbon monoxide co-absorbed in the gas scrubber and also carbon dioxide, are recirculated via the lines 9 and 10 and also the compressor V to the shifted crude synthesis gas 1. The two liquid phases 11 and 12 from the separators D1 and D2 are passed to the further regenerating part R in order to separate off sulfur components and carbon dioxide and to obtain a regenerated, unloaded methanol scrubbing medium 13 that is cooled in heat exchanger E2 against a partially regenerated methanol scrubbing medium 14, which, before further treatment thereof in the regenerating part R, is further warmed in the heat exchanger E3 against loaded methanol scrubbing medium 4. While a first part 3 of the cooled methanol scrubbing medium is fed to the absorber column A1, a second part 15 flows into the second scrubbing installation A2 that is likewise designed as an absorber column.

Unshifted synthesis gas 17 that is cooled in advance in the heat exchanger E4 against method streams that are to be warmed is fed to the absorber column A2, in the lower region thereof, via line 16, which absorber column A2 is typically operated at a pressure situated between 20 and 80 bar, which is above the operating pressure of the absorber column A1. In contrast to the absorber column A1, the absorber column A2 only has one scrubbing section 33. The cold synthesis gas 17 is passed upwardly in the absorber column A2 and in this case brought into intensive contact with methanol scrubbing medium 15 that is fed at the upper scrubbing section 33 via the control element e. The amount of scrubbing medium may be measured in such a manner that the sulfur components present in the synthesis gas 17 are substantially completely separated off, without however reducing in this case the carbon dioxide content more than is necessary. From the top of the absorber column A2, therefore, a substantially desulfurized gas 18 that consists only of hydrogen, carbon monoxide and carbon dioxide can be taken off and that, after warming against the crude synthesis gas 16, is delivered, for example, as fuel gas 19 for a gas turbine. The methanol scrubbing medium 20 that is loaded during the scrubbing of the unshifted synthesis gas 17 is expanded from the sump of the absorber column A2 via the throttling element f to one of the lowest mass-transfer trays B of scrubbing section S1 of the absorber column A1, wherein hydrogen and carbon monoxide that are co-absorbed during the scrubbing of the unshifted synthesis gas 17 are released in the gas phase, whereby the yield of crude hydrogen 8 increases. In particular, the release of carbon monoxide is supported in this case by the low carbon monoxide partial pressure of the shifted synthesis gas 2. Sulfur components that are likewise transferred from the loaded methanol scrubbing medium 20 to the gas phase are back-extracted by the methanol scrubbing medium 5.

What we claim is:

1. A method for operating a gas scrubber, in which a first feed gas is scrubbed in a first scrubbing installation and a second feed gas is scrubbed in a second scrubbing installation operated in parallel to the first, in each case with the same physically acting scrubbing medium, in order to dissolve sulfur components out of the feed gases containing hydrogen, carbon monoxide, carbon dioxide, and also carbonyl sulfide and/or hydrogen sulfide and to obtain desulfurized gas streams, wherein scrubbing medium streams loaded with sulfur components and co-absorbed carbon monoxide arise, and wherein the first feed gas, the carbon monoxide partial pressure of which is lower than that of the second, is scrubbed in the first scrubbing installation at a lower pressure than the second feed gas in the second scrubbing installation, characterized in that scrubbing medium that is loaded in the second scrubbing installation with sulfur components and co-absorbed carbon monoxide is expanded into the first scrubbing installation in order to convert dissolved carbon monoxide to the gas phase.

2. The method according to claim 1, characterized in that scrubbing medium that is loaded in the second scrubbing installation is taken off from the first scrubbing installation and expanded in order to convert co-absorbed substances into the gas phase which is then compressed and recirculated to the first scrubbing installation.

3. The method according to claim 1, characterized in that an absorber column having a section for separating off sulfur components is used at least as first scrubbing installation, into which section second scrubbing medium that is loaded in the second scrubbing installation with sulfur components and co-absorbed carbon monoxide is introduced immediately above one of the lowest mass-transfer trays, or of the lowest mass-transfer packing, or in the region of the lowest mass-transfer packing.

4. The method according to claim 1, characterized in that the two feed gases are obtained from a synthesis gas that for this purpose is divided into two parts, wherein the one part, after a treatment by water gas shift, is present as first feed gas and the second part forms the second feed gas.

5. The method according to claim 1, characterized in that methanol is used as physically acting scrubbing medium.

* * * * *